United States Patent [19]

Drake

[11] Patent Number: 6,052,197
[45] Date of Patent: Apr. 18, 2000

[54] APPARATUS FOR WAFER LEVEL TESTING OF A MICROMACHINED DEVICE

[75] Inventor: Joseph David Drake, Palo Alto, Calif.

[73] Assignee: Scotts Technology Inc., Scotts Valley, Calif.

[21] Appl. No.: 09/149,919

[22] Filed: Sep. 9, 1998

Related U.S. Application Data

[60] Provisional application No. 60/089,358, Jun. 15, 1998.

[51] Int. Cl.[7] .................................................. G01N 21/55
[52] U.S. Cl. ........................... 356/445; 356/382; 356/376
[58] Field of Search ..................................... 356/445, 382, 356/376, 372, 373

[56] References Cited

U.S. PATENT DOCUMENTS 5,679,502  10/1997  Siddons et al. .......................... 430/397

*Primary Examiner*—Frank G. Font
*Assistant Examiner*—Roginald A. Ratliff
*Attorney, Agent, or Firm*—Mark Wardas

[57] ABSTRACT

An apparatus designed for the testing of micro-machined torsional mirrors at the wafer level is described. A control station is coupled to an electro-optic assembly that has been designed for the purpose of testing mirrors. Three standard probes are coupled to the electro-optic probe assembly to provide electrical connections to a particular mirror of a wafer under test. Optical components are coupled to the electro-optic probe to deliver laser light to a deflectable plate portion of the mirror. Displacement of the reflected laser light spot is detected as the mirror plate is vectored and this displacement is compared to specifications such that the mirror under test can be either accepted or rejected.

18 Claims, 4 Drawing Sheets

APPARATUS FOR WAFER LEVEL TESTING OF A MICROMACHINED DEVICE

RELATED APPLICATIONS

The present invention is related to and claims priority from commonly assigned U.S. Provisional Application Ser. No. 60/089,358, filed on Jun. 15, 1998, which is incorporated herein by reference.

FIELD OF THE INVENTION

The present invention relates generally to the wafer level testing of micro-machined devices and more specifically to the testing of micro-machined mirrors used as a fine actuator for data tracking in an optical data storage and retrieval system.

BACKGROUND

In "A High-Resolution Laser-Based Deflection Measurement System for Characterizing Aluminum Electrostatic Actuators" (Proceedings of Transducers 1995; Stockholm, Sweden; pp. 308–311), testing of torsional aluminum actuators for angular deflection and dynamics using standard benchtop optics is described. Laser light is produced by a He—Ne laser with a 500 $\mu$m beam diameter and is directed through an attenuator, a beam splitter, and a lens that focuses a spot onto an actuator surface. Light reflected from the actuator surface passes back through the lens and is diverted by the beam splitter onto two photodiodes positioned 100 $\mu$m apart. Upon actuation, the spot position with respect to the position of the two photodiodes is detected as a difference in illumination between the two photodiodes. Spot movement is a function of actuator angular rotation and the focal length of the lens. Standard optical and electronic methods are used to deduce the voltage sensitivity and dynamic response of the actuator from measurements of the movement of the spot.

Testing of a micro-machined mirror at an individual component level could be done in a manner very similar to what is described in this paper. However, the drawback is that in order to test each mirror chip, the chip would need to be mounted on a suitable fixture that provides a means to supply the mirror's actuation signal. This fixture would then mounted such that a deflectable surface of the mirror was aligned correctly with respect to the incoming laser beam. The mirror would then be tested and if it met specifications it could be assembled as part of an optical head of an optical data storage and retrieval system and if not acceptable it would be discarded. Testing in this manner would be slow, tedious, and would subject the mirror chips to considerable handling risk which would be compounded by the fragile nature of the mirror's deflectable plate and the very small size of the chip itself (as for example 0.7 mm×1.5 mm). To date, the use of micro-machined mirrors in a commercial optical data storage product is not known. Hence, a need for high volume manufacturing and testing of micro-machined mirrors has not been necessary.

Probe control stations equipped with device-specific probe cards are used in the semiconductor industry for the wafer level testing of integrated circuits. These machines allow for the rapid and automated testing of a plurality of circuits patterned onto a wafer. Devices tested in this manner can be rejected and appropriately marked at the wafer level if they don't perform to specifications, thus, simplifying the sorting of good from bad parts. Connection to a computer allows for the transfer and storage of the test results for later retrieval and analysis. Such systems have been typically applied to electrical testing of discrete semiconductor devices or semiconductor integrated circuits.

What is needed is a method for testing the electrical-optical-mechanical performance of micro-machined parts at the wafer level in a manner that is compatible with the high volume manufacturing procedures.

OBJECTS AND ADVANTAGES

Accordingly, several objects and advantages of the present invention are:

(a) to provide for the use of a computer to take, transfer, and store test results for later retrieval and analysis;

(b) to provide a means of high speed testing of freely rotatable micro-machined mirrors;

(c) to provide a means of high speed testing of micro-machined mirrors for proper movement when a voltage is applied to a left side drive electrode while a right side and center (ground) pad are grounded and when the voltage is applied to the right side drive electrode while the left side and center (ground) pad are grounded;

(d) to provide a measurement of the mirror's modal frequency for torsional excitation and its quality factor, Q, for this mode;

(e) to provide for a characterization of the sensitivity of a mirror's deflection angle as a function of an applied actuation voltage;

(f) to provide a means for characterizing optical properties of the micro-machined mirror, for example, reflectivity.

Further objects are to make use the above mentioned techniques for the high speed inspection of electrical-mechanical-optical components in which such inspection criteria can be easily changed through the modification of inspection of hardware and software.

SUMMARY OF THE INVENTION

In the present invention, an electro-optic probe assembly is used to perform a wafer level test of a torsional micro-machined mirror. In operation, the electro-optic probe assembly is connected to a control station. The electro-optic probe assembly is oriented horizontally and parallel to the surface of a control station wafer support stage. A wafer is placed on the support stage and held in place with vacuum. The control station provides for vertical translation such that probes can be raised out of contact with the wafer as needed. Prior to testing, the probes are aligned to the wafer surface such that the probes electrically connect to a set of mirror drive pads. Once the probes are in contact with the drive pads, computer-controlled testing of the mirror device proceeds. A laser beam is directed and focused onto a reflective rotatable plate of an individual mirror on the wafer and the mirror plate vectored by a changing electrical charge applied to the mirror drive pads. The tests involve electro/optical/mechanical characterization of return laser light deflection as the mirror plate is vectored, with overall results sent to a computer for storage and data reduction. At the end of the test, the probes and the drive pads are separated and the wafer support stage or the probes are indexed such that the drive pads of the next device to be tested are aligned to the probes. Prior to indexing to the next device, the tested mirror maybe marked (such as with a drop of ink) if it has failed to meet performance specifications. Three degrees of movement of the electro-optic probe assembly, marking of failed dies, and indexing of the wafer stage may be accomplished automatically by the control station.

BRIEF DESCRIPTION OF THE ILLUSTRATIONS

DETAILED DESCRIPTION OF THE PREFERRED EMBODIMENTS

Figure 1:
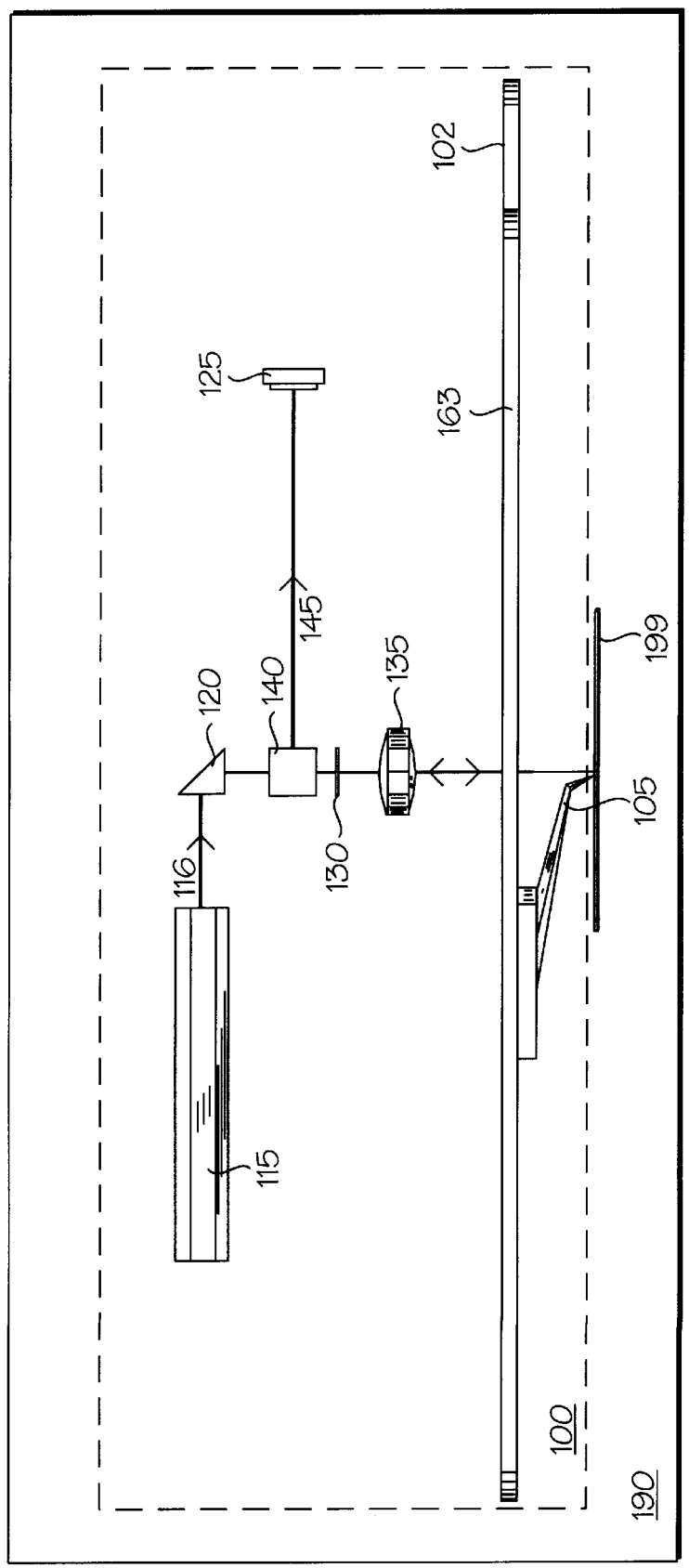
FIG. 1 is a cross-section of an electro-optic probe assembly in contact with a micro-machined mirror to be tested and showing a laser light source and optical components placed overhead and focused onto the mirror.

The invention is described with reference to attached FIGS. 1, 2, 3, and 4 all of which pertain to the use of optical components as configured as part of an electro-optic probe assembly 100 of a control station 190. In the present invention the electro-optic probe assembly 100 is used for testing of a wafer 199 comprised of a plurality of individual torsional micro-machined mirrors 110 (FIG. 3). After testing, individual mirrors 110 with acceptable characteristics are diced and mounted for use on an optical head of an optical data storage system. Use of torsional micro-machined mirrors in an optical data storage system is disclosed in commonly assigned U.S. patent application Ser. No. 08/844,207, filed on Apr. 18, 1997, which is incorporated herein by reference.

One of the steps in the normal processing of the wafer 199 is a hydrofluoric acid release etch step which removes a phosphosilicate glass (PSG) sacrificial layer thus allowing the formation a rotating mirror plate 197 (FIG. 3). During fabrication, this step is typically followed by the separation of the wafer 199 into individual mirrors 110. The diced individual mirrors 110 are tested on a piece by piece basis to establish their acceptability before an assembly step into a target device such as an optical data storage system. In the prior art, damage to the individual mirrors 110 (or chips) as a result of the handling required to test them is a common occurrence. In addition, testing in this manner is slow and cumbersome and therefore is not preferred for high volume manufacturing. The present invention identifies that because the mirrors 110 are fully functional on the wafer 199 following the release etch step they can be tested prior to the dicing step. The sorting and tracking of the good mirror 110 is more challenging than with the prior art but is accomplished routinely by the present invention.

In the present invention, electrical probes 105 comprising the electro-optic probe assembly 100 are aligned so that they can be aligned with the mirror's 110 three drive pads 191 (FIG. 3) simultaneously. Conductive traces comprising the electro-optic probe assembly 100 electrically connect the probes 105 to an edge connector 102. The edge connector 102 is designed to mate with a connector of opposite gender (not shown) of the control station 190. Drive wires within the wiring harness are attached to the appropriate pins of the opposite gender connector such that drive signals can be delivered to the correct probes 105. The output of electronic circuitry (not shown) for generating the drive signals is connected to the other ends of the wires in the wiring harness. In one embodiment, the electro-optic assembly 100 may comprise a rigid substrate or "edge connector card" 163 of a variety well known in the art. The design of a control station 190 for coupling the probes 105 of electro-optic assembly 100 of the present invention to a particular micro-machined mirror 110 of a wafer 199 is understood to be within the scope of one of ordinary skill in the art.

In one embodiment of the present invention, a laser source 115 is coupled to the electro-optic probe assembly 100. A laser diode, well known in the industry, may provide the laser source 115. The laser source 115 may be equipped with the necessary components for circularizing an emanating laser beam 116. The present invention is further illustrated in FIG. 3 to comprise: a folding prism 120, a polarization beam splitter (PBS) 140, a quarter wave plate 130, and a focusing lens 135. In this embodiment, the laser beam 116 is emitted from the source 115 and propagates parallel to the electro-optic probe assembly 100 surface. After leaving the source 115, the laser light is reflected by the prism 120 toward the surface of the wafer 199 through optics that include the beam splitter 140, the quarter wave plate 130, and the lens 135. The prism 120 directs the beam 116 while allowing adequate spacing for viewing the wafer 199 and probes 105. It is understood that in other embodiments other combinations and types of optics including fewer or lesser number of optics are within the scope of the present invention, which should be limited only by the scope of the following claims. The lens 135 focuses the beam 116 onto the rotatable mirror plate 197 portion of a particular mirror 110. Light reflected off of the mirror plate 197 returns through the lens 135 and then back through the quarter wave plate 130 and PBS 140. The PBS 140 is arranged to cause the reflected light to be directed parallel to the surface of the wafer 199 and onto the active area of a position sensitive detector (PSD) 125. The round trip through the quarter wave plate 130 insures that little or no light is transmitted vertically back through the PBS 140 thereby minimizing undesirable feedback to the laser source, however it is understood that in other embodiments with minimal feedback present a quarter wave plate 130 would not necessarily be required.

Configuration of the optical path in this manner provides the necessary means by which the rotatable mirror plate 197 portion of the reflective surface of the mirror 110 may be characterized. The beam 116 is collimated until it enters the focusing lens 135. Thus, if the beam 116 is in focus in a plane of the mirror plate 197, the reflected beam 145 will also be collimated after passing back through the lens 135. In an undeflected mirror plate case, light reflected off of the mirror plate 197 retraces the path of the incoming beam 116 until it hits the PBS 140 as a spot and is redirected to the PSD 125. Angular deflection of the mirror plate 197 causes the reflected beam 145 to propagate back to the lens 135 along an alternate path to that of the beam 116. For small deflection angles the beam is still collimated upon exiting the lens 135 and the spot impinging on the PSD 125 will be translated with respect to the undeflected mirror plate case. A spot translation distance, d, in this case is given by the following relationship $d = f \tan(2\theta)$, where f is the focal length of the lens 135 and $\theta$ is the angular deflection of the mirror plate 197. The focal length of the lens 135 and the size of the PSD 125 active area are chosen such that all deflection angles of interest will result in spot translations that will fit on an active area of the PSD 125. In an exemplary embodiment in which the lens 135 comprises a focal length of 20 mm, a mirror plate 197 having a maximum single-sided deflection angle at pull-in of 6.5 degrees will cause, at most, a spot translation of 4.6 mm. In this embodiment, to record single-sided deflection angles of the mirror plate 197, the useful active area of the PSD 125 should be on the order of 4.6 mm.

It should be noted that the electro-optic probe assembly 100 described above could include a means by which to calibrate the spot translation "d" to a known angular rotation of a reflecting surface. For example, a rotatable calibration mirror (not shown) could be placed in the path of the beam 116 where mirror 110 on a wafer 199 would normally be located during testing. Mounting hardware would allow for placement of the calibration mirror during calibration procedures and retraction of it during testing of the wafer 199. Preferably the calibration mirror could be rotated to precise and understood calibration angles with a rotational axis placed appropriately so as to mimic the rotation of the mirror plate 197.

The operation of a PSD 125 is well understood by those practiced in the art of photo-detection. Upon illumination by the spot comprising the reflected beam 145, charge is generated within an active region of the PSD 125. For a one-dimensional PSD, the charge is driven through a resistive layer towards two electrodes positioned on opposite sides of a rectangular active area. Because the resistivity of this layer is uniform, the current collected at an electrode is inversely proportional to the distance between the incident spot and the electrode. Measurement of the relative magnitudes of the currents collected at the two electrodes allows for determination of the spot position between them. Operation of a two-dimensional PSD is similar except that a second pair of electrodes exists transverse to the other pair of electrodes so that the position of the spot can be determined with respect to two orthogonal dimensions.

External circuitry is connected to the PSD 125 in order to provide a supply voltage (+5V or −5V, for example, depending on the PSD's 125 structure) and to amplify the current coming off of the electrodes. A typical 2-stage amplification approach would involve an initial transimpedance amplification stage that converts the electrode current into a voltage proportional to its magnitude. For a one-dimensional PSD, the second stage is used to compute both the difference and the sum of the first stage outputs. An additional sum and difference channel is included to provide the corresponding values for the second axis of a two-dimensional PSD. Optionally, this second stage can provide additional amplification of the first stage signals. The difference output of the second stage provides the spot position information for that axis of the PSD. If desired, this difference output can be divided by the summing output of the second stage to provide normalization of the position information as well as to reduce the influence of laser source intensity fluctuations. As can be deduced from the preceding description, a null difference signal would indicate that the centroid of the spot is at the center of the PSD 125; negative values would correspond to a spot falling on one side of the PSD 125 and positive values would correspond to the PSD's 125 other side. This "sum and difference" approach for photo-detection is widely used in the industry and commercial signal processing circuitry is available for such applications.

The PSD 125 used in this application could be either of the one-dimensional or two-dimensional variety and its active area would be aligned such that the reflected beam 145 would displace along it. The two-dimensional PSD has the advantage that it provides information on any off-axis motion of the mirror plate 197. An appropriate combination of PSD 125 and associated electronics is provided by, for example, the Model S2044 two-dimensional PSD and Model C4674 signal processing circuit, both of which are manufactured by Hamamatsu Corporation, Hamamatsu City, Japan.

Figure 2:
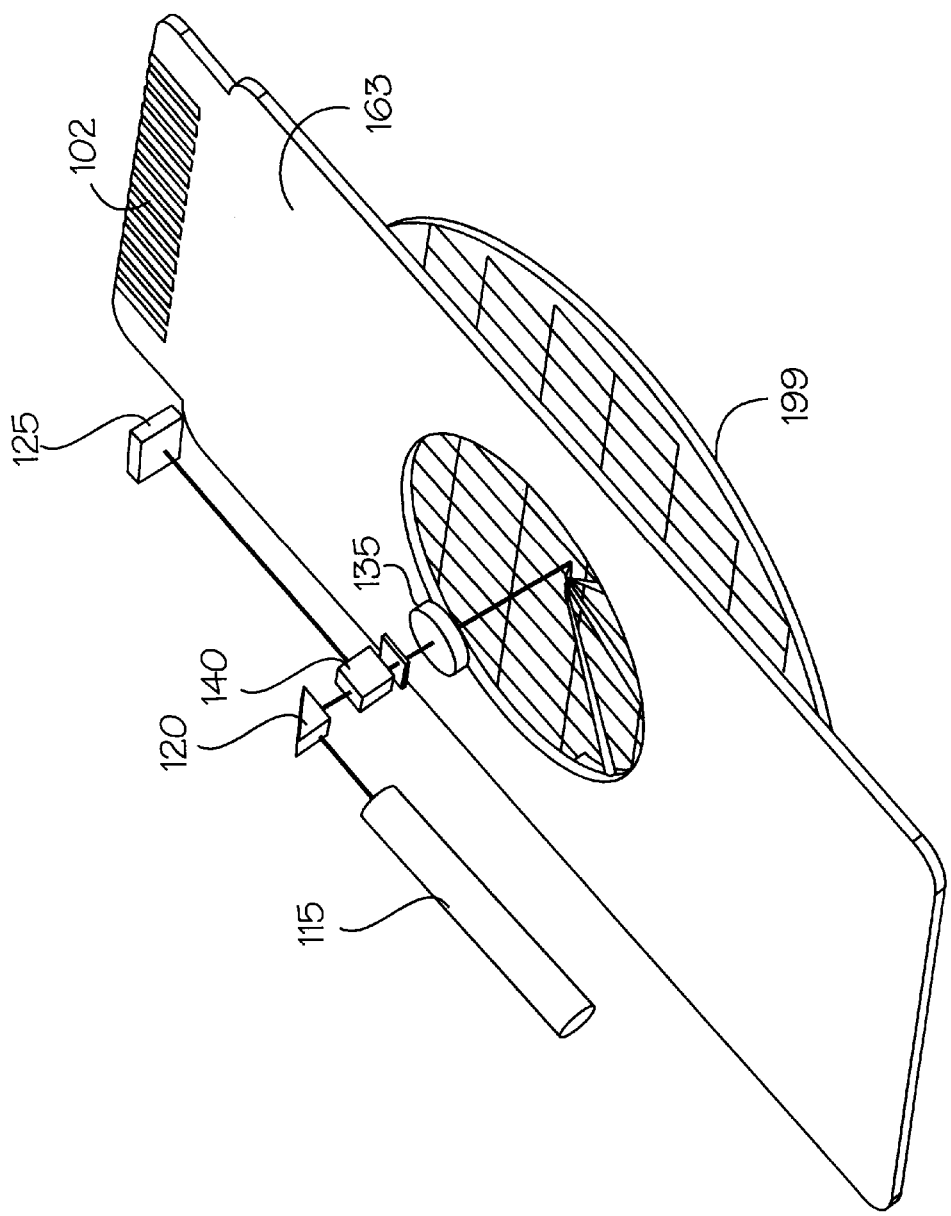
FIG. 2 is a perspective view of a possible arrangement for a laser source and optics above an electro-optic probe assembly, which has indexed and has its probes in contact with the bond pads of a micro-machined mirror to be tested.
Figure 3:
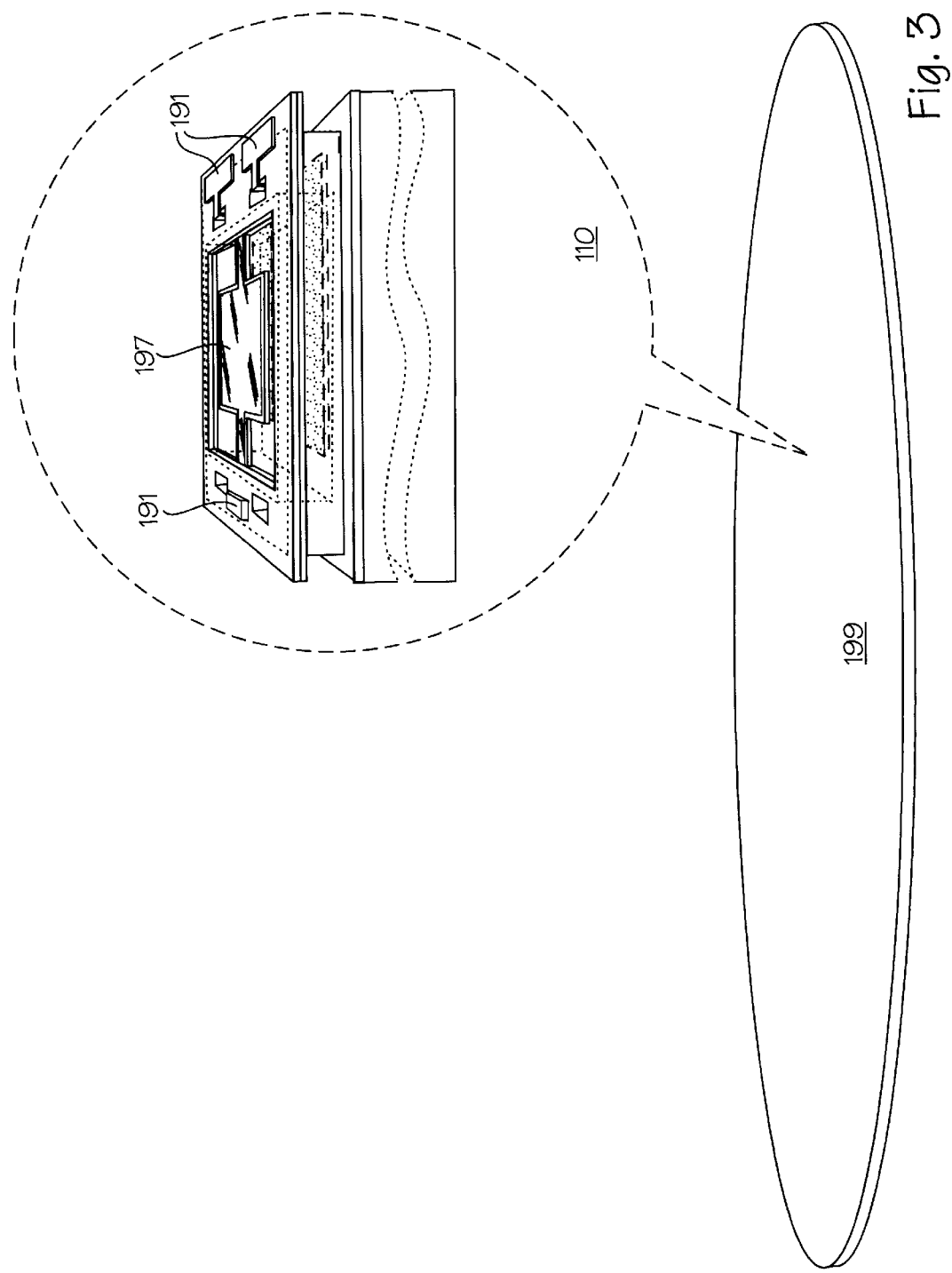
FIG. 3 is a view of an individual micro-machined mirror and electrode and ground attach points of a wafer.
Figure 4:
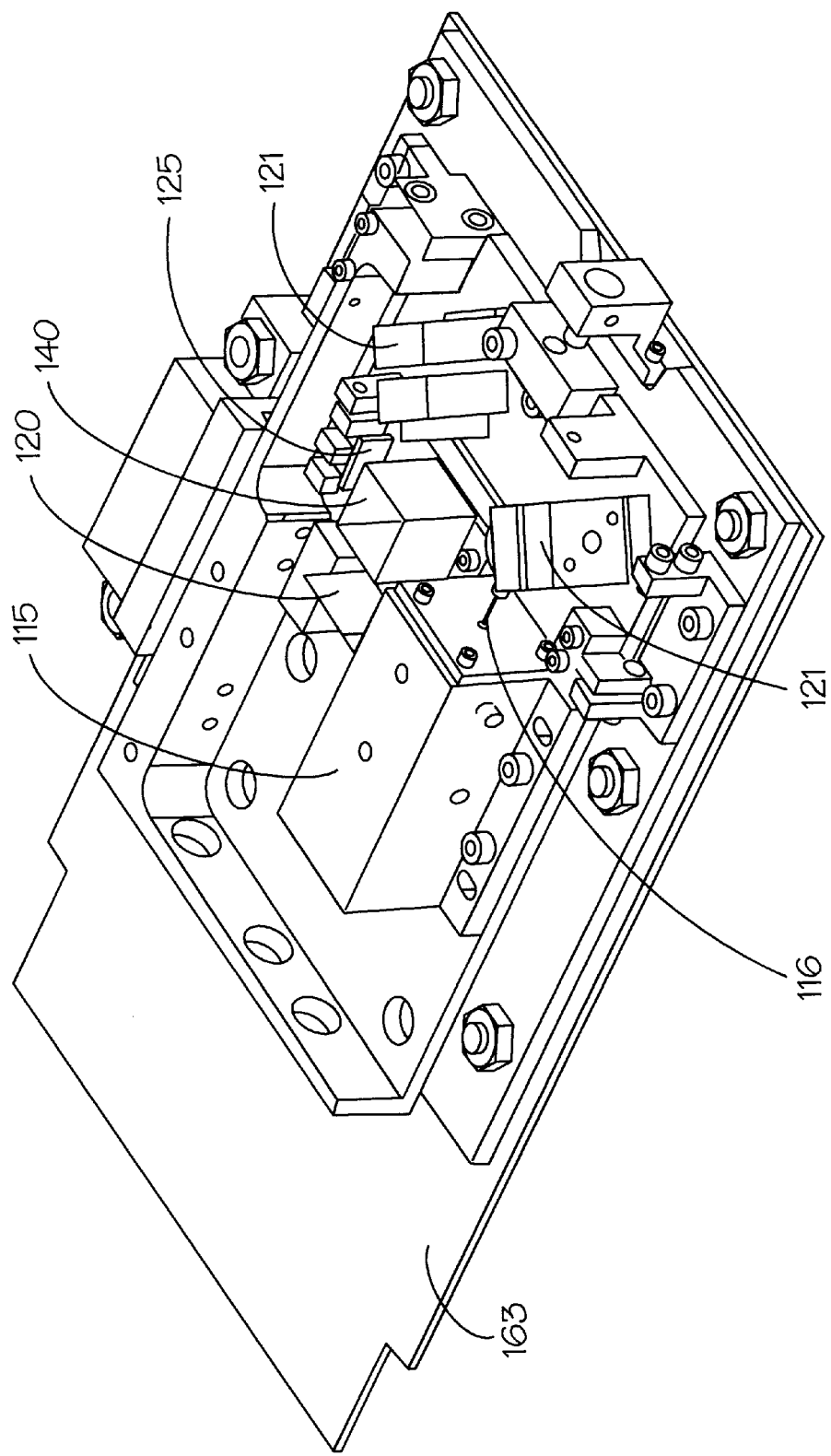
FIG. 4 is a perspective view of an embodiment of an electro-optic probe assembly of the present invention.

For clarity with respect to visualizing the present invention, hardware required to hold the optical elements of the present invention in place is not shown in the FIGS. 1–3. However, it should be noted that this hardware preferably would provide some of the following features:

Rigid mounting of optical elements.

Alignment of optical elements with respect to each other so that their optical path is correctly constructed with appropriate positional tolerances.

Alignment of optical elements with respect to the probes 105 such that the beam 116 correctly illuminates the geometric center of the mirror plate 197 when the probes 105 are in contact with the mirror drive pads 197.

Alignment of optical elements with respects to the probes 105 such that the beam 116 is in focus at the plane of the reflecting surface of the mirror plate 197.

Alignment of optical elements with respect to a viewing path such that the probes 105 can be correctly aligned to the mirror drive pads 191 by an operator.

One practiced in the art of design of optical fixtures will recognize that in order to provide the above features the mounting hardware is likely to require various adjustment mechanisms for positioning of the optical elements. An embodiment incorporating some of these features is shown in a top perspective view in FIG. 4 (probes not visible). In this embodiment the optical components are seen to be disposed compactly in two dimensions along a plane that is parallel to the card 163 and includes routing reflectors 121 for directing the beam 116.

Testing of a particular mirror 110 may proceed as follows. Typically a drive voltage is applied to the drive pads 197 in the form of a repeating waveform that oscillates between 0 volts and 100–200 volts at a frequency of, say, 500 Hz. Various combinations of waveform shape, amplitude, offset, and frequency measurements can be used to test, for example, the following:

Functionality: A variable drive voltage is applied to the pad corresponding to a right side of the mirror plate 197 (with the pads corresponding to a left side of the mirror plate 197 and a center ground pad grounded) and a difference output signal from the PSD 125 is monitored to verify it has been modulated in phase with the drive voltage. Next the drive voltage is applied to the pad corresponding to the left side of the mirror plate 197 (with the right side and center ground pad grounded) and the difference output is monitored to verify that it has been modulated in phase with the drive voltage. During testing it should be noted that the modulation caused by actuation of the left side of the mirror plate 197 should be of the opposite direction with respect to the center of the PSD 125 than that caused by actuation of the right side of the mirror plate 197.

Voltage Sensitivity: The magnitude of the modulated PSD 125 amplifier difference signal will be proportional to the distance the beam 145 moves across the active area of the PSD 125. Thus the magnitude of the modulation of the difference output signal with respect to the amplitude of a drive voltage provides a measure of voltage sensitivity of the mirror 110. For characterization of the mirror 110 it is useful to have a graphical representation of the deflection angle of the mirror plate 197 as a function of the applied drive voltage. This can be achieved by providing the drive voltage in the form of a voltage ramp from 0 volts to, for example, 100–200 volts; the PSD 125 output signal is then of the desired form and standard data analysis can convert it to the appropriate graphical representation.

Mirror Dynamics: The frequency response of the mirror 110 can be determined by first applying a square wave to one side of the mirror plate 197 as previously described (step drive). A difference output of the PSD 125 then represents the mirror's 110 step response that is then differentiated to arrive at its impulse response. An FFT algorithm applied to the impulse response then yields the mirror's 110 frequency response. Resonant frequency and quality factor is then easily determined from this calculated frequency response as is widely understood in the industry. Alternatively, a commercially available spectrum analyzer in place of the oscilloscope can make the measurement where the drive signal would be a small ac signal superimposed on a larger dc offset voltage.

The present invention provides a mechanism whereby each mirror 110 of a wafer 199 may be electro/optically/mechanically tested in turn and then marked if it fails to meet specifications. For this invention, a personal computer may interface with the control station 190. Application specific test code for coordination of the testing is written in, for example, LabView, LabWindows, Visual Basic or some other similar test development software package. Data for each device tested is collected by the software and stored in data files to allow for subsequent data analysis. During testing the computer's monitor screen can provide useful information to the observer, for example, test status of the device under test, identification of the currently tested part, pass/fail statistics for the wafer 199, and estimated time for completion of the test for that wafer. The software is written such that it sends appropriate instructions to the control station 190 with respect to sequencing from mirror to mirror and, as needed, marking failed devices.

The computer also interfaces to the circuitry that generates the mirror 110 drive signals such that it can control the sequencing of the tests to be performed on each mirror 110. Data from the PSD 125 signal processing circuit is sent to the computer's data acquisition board that is interfaced to the test software. Typically the data acquisition board would be in the form of a digitizing oscilloscope.

Alternate embodiments for this invention include, but are not limited to, the following configurations:

1. Aligning the probes 105 to the drive pads 191 of the mirror 110 to be tested, the optical elements on the optics side of the electro-optic probe assembly 100 may obscure the view of the mirror 110. In order to avoid the resulting confusion, the viewing optics could be arranged such that the operator views a mirror 110 chip adjacent to the one to be measured. The electro-optic probe assembly 100 provides the means to correctly position the probes 105 and optics with reference to the viewed mirror 110.
2. Mounting hardware on the optics side of the electro-optic probe assembly 100 may provide a means by which the optical elements may be retracted modularly for the purpose of viewing and aligning the probes 105 to the drive pads 191 of the mirror 110 to be tested. During testing, the optics would then be precisely placed back in the correct position.
3. A reflecting mirror appropriately inclined at a 45-degree angle with respect to the laser beam 116 may replace the folding prism 120.
4. A simple optical beam splitter may replace the PBS 125 and quarter wave plate 130 combination.
5. A photodiode pair and associated electronics or similar optical detection arrangement may replace the PSD 125 and its electronics.
6. An appropriately designed laser filter can be placed in an optical path of viewing optics stand to prevent the accidental exposure of the viewer's eyes to the laser source 115.
7. The PSD 125 may be mounted on the optics side of the electro-optic probe assembly 100 such that it can be translated in the two axes orthogonal to the axis of the beam 145 thus allowing for a larger effective active area of the PSD 125.
8. The invention can be applied to a broader range of micro-machined devices on wafers other than the micro-machined mirror 110. For example, the deflections of other micro-machined structures on wafers (i.e. cantilevers, translating mirrors, comb drives) can also be characterized in this manner.
9. By monitoring its summing output, the PSD 125 electronics can also provide the means by which to characterize the reflectivity of the mirror 110 surface.

It should be noted that further embodiments with respect to the configuration of the electro-optic probe assembly 100, configuration and choice of the optical elements on the electro-optic probe assembly 100, design of the approach to PSD 125 calibration, design of the computer interface, and the design of the data handling methods used are extensions to the described invention which would be obvious to one practiced in the arts of optical detection, automated integrated circuit testing, and electronic instrumentation.

What is claimed:

1. An assembly employed to obtain information about a micro-machined part, the assembly comprising:
   a source of light;
   at least one electrical probe for applying a potential to the micro-machined part;
   a detector; and
   optics sufficient to direct the light from the source towards the micro-machined part and sufficient to direct from the micro-machined part a reflection of the light towards the detector, wherein the information about the micro-machined part is obtained based on detection of the reflection of the light by the detector.

2. The assembly as set forward in claim 1, wherein the micro-machined part comprises a surface, and wherein the reflection of the light is displaced by the surface.

3. The assembly as set forward in claim 2, wherein the surface comprises a movable surface.

4. The assembly as recited in claim 3, wherein the movable surface comprises a reflective portion.

5. The assembly as set forward in claim 2, wherein the information comprises a frequency response of the micro-machined part.

6. The assembly as set forward in claim 2, wherein the information comprises a voltage sensitivity of the micro-machined part.

7. The assembly as set forward in claim 2, wherein the information comprises a functionality of the micro-machined part.

8. The assembly as set forward in claim 2, wherein the information comprises an optical quality of the micro-machined part.

9. The assembly as recited in claim 1, wherein the micro-machined part comprises a torsional micro-machined mirror.

10. The assembly as recited in claim 1, wherein the optics comprises a focusing lens and a beam splitter, and wherein the detector comprises a position sensitive detector (PSD).

11. The assembly as recited in claim 1, wherein the micro-machined part comprises a wafer, wherein the wafer comprises individual micro-machined mirrors, and wherein a control station selectively couples a particular micro-machined mirror to the electrical probes.

12. A method for testing of a micro-machined part, comprising the steps of:

directing a light towards the micro-machined part;

applying a potential to the micro-machined part; and evaluating the micro-machined part based on detection of a return of the light from the micro-machined part.

13. The method of claim 12, wherein the micro-machined part comprises a wafer.

14. The method of claim 13, wherein the wafer comprises a plurality of deflectable micro-machined mirrors, and wherein the step of evaluating comprises selectively evaluating a deflectable micro-machined mirror.

15. The method of claim 12, wherein the step of evaluating comprises dimensional evaluation of the micro-machined part.

16. The method of claim 12, wherein the step of evaluating comprises electrical evaluation of the micro-machined part.

17. The method of claim 12, wherein the step of evaluating comprises mechanical evaluation of the micro-machined part.

18. An assembly employed to obtain information from micro-machined parts, the assembly comprising:

means coupled to the assembly for providing radiant energy to the micro-machined part;

means coupled to the assembly for applying a potential to the micro-machined part; and means coupled to the assembly sufficient to direct the radiant energy provided by the radiant energy providing means onto the micro-machined part and sufficient to direct a reflection of the radiant energy provided by the radiant energy providing means from the micro-machined part towards a detection means coupled to the assembly, wherein the detection means is capable of evaluating the reflection of the radiant energy provided by the radiant energy providing means to obtain the information.

* * * * *